US009430318B2

(12) United States Patent
Aggarwal et al.

(10) Patent No.: US 9,430,318 B2
(45) Date of Patent: Aug. 30, 2016

(54) HEALTH MONITORING AND RECOVERY FOR INFRASTRUCTURE DEVICES

(71) Applicant: MICROSOFT CORPORATION, Redmond, WA (US)

(72) Inventors: Chandan Aggarwal, Seattle, WA (US); Asad Yaqoob, Redmond, WA (US); Josh David McKone, Bothell, WA (US); Matthew Jeremiah Eason, Sammamish, WA (US); Akil M. Merchant, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 203 days.

(21) Appl. No.: 14/164,829

(22) Filed: Jan. 27, 2014

(65) Prior Publication Data
US 2015/0212901 A1 Jul. 30, 2015

(51) Int. Cl.
*G06F 11/30* (2006.01)
*G06F 11/07* (2006.01)

(52) U.S. Cl.
CPC ....... *G06F 11/0793* (2013.01); *G06F 11/0709* (2013.01); *G06F 11/0778* (2013.01); *G06F 11/3051* (2013.01); *G06F 11/3055* (2013.01); *G06F 11/3096* (2013.01)

(58) Field of Classification Search
CPC .......... G06F 11/0703; G06F 11/0793; G06F 11/0709; G06F 11/3051; H04L 41/0654; H04L 41/0681; H04L 41/0695
See application file for complete search history.

(56) References Cited

U.S. PATENT DOCUMENTS

| | | | | |
|---|---|---|---|---|
| 5,081,598 A | * | 1/1992 | Bellows | G06F 11/2257 700/81 |
| 6,516,427 B1 | * | 2/2003 | Keyes | G06F 11/0709 709/226 |
| 7,469,279 B1 | * | 12/2008 | Stamler | H04L 41/0672 709/220 |
| 7,522,036 B1 | * | 4/2009 | Preuss | H05K 7/1457 307/150 |
| 7,992,014 B2 | | 8/2011 | Langgood et al. | |
| 8,321,163 B2 | | 11/2012 | Ewing et al. | |
| 8,365,009 B2 | | 1/2013 | Dournov et al. | |
| 8,494,661 B2 | | 7/2013 | Ewing et al. | |

(Continued)

FOREIGN PATENT DOCUMENTS

| | | |
|---|---|---|
| WO | 2012021759 A2 | 2/2012 |
| WO | 2012061014 A1 | 5/2012 |

OTHER PUBLICATIONS

"Innovative Technologies in HP ProLiant Gen8 Servers" published Mar. 2012 http://www.hpe.azlan.com/Global/documents/c03227849.pdf?epslanguage=en.*

(Continued)

*Primary Examiner* — Joseph Schell
(74) *Attorney, Agent, or Firm* — Ben Tabor; Kate Drakos; Micky Minhas (57) ABSTRACT

Automated health monitoring and recovery is provided for infrastructure devices supporting server devices in a data center. Health analysis operations may be selected to be performed on an infrastructure device based on the capabilities of the infrastructure device and/or how the infrastructure device is being used to support server devices in the data center. If the infrastructure device is unhealthy, an automated recovery operation may be performed. The automated recovery operation may include recovery actions selected based on the capabilities of the infrastructure device, the failure mode of the infrastructure device, and/or how the infrastructure device is being used to support server devices in the data center.

20 Claims, 4 Drawing Sheets

(56) References Cited

U.S. PATENT DOCUMENTS

| | | | |
|---|---|---|---|
| 2005/0050182 A1* | 3/2005 | Neville | G06F 11/0709 |
| | | | 709/223 |
| 2007/0292145 A1* | 12/2007 | Drose | G03G 15/5079 |
| | | | 399/8 |
| 2009/0282274 A1 | 11/2009 | Langgood et al. | |
| 2010/0005331 A1 | 1/2010 | Somasundaram et al. | |
| 2010/0058092 A1* | 3/2010 | Bougaev | G06F 1/28 |
| | | | 713/340 |
| 2010/0262467 A1* | 10/2010 | Barnhill, Jr. | H04L 12/2809 |
| | | | 709/223 |
| 2010/0328849 A1* | 12/2010 | Ewing | G06F 1/266 |
| | | | 361/622 |
| 2011/0320834 A1* | 12/2011 | Ingels | G06F 1/266 |
| | | | 713/310 |
| 2012/0066541 A1* | 3/2012 | Dournov | G06F 11/0709 |
| | | | 714/3 |
| 2014/0115307 A1* | 4/2014 | Knight | G06F 1/24 |
| | | | 713/1 |

OTHER PUBLICATIONS

"Choosing Power Distrubution Units (PDUs) for Networking, Server and Telecom Applications", In White Paper, Jan. 5, 2011, 6 pages.

"Power Monitoring and Environmental Monitoring to Improve Uptime and Capacity Planning", Published on: Feb. 23, 2009, Available at: http://www.raritan.co.in/resources/white-papers/power-management/pdus-power-monitoring-and-environmental-monitoring-to-improve-uptime-and-capacity-planning.pdf.

"Service Migratio", Published on: Feb. 14, 2012, Available at: http://docs.oracle.com/cd/E15051_01/wls/docs103/cluster/service_migration.html.

* cited by examiner

HEALTH MONITORING AND RECOVERY FOR INFRASTRUCTURE DEVICES

BACKGROUND

Large-scale networked systems are commonplace systems employed in a variety of settings for running service applications and maintaining data for business and operational functions. For instance, a data center within a networked system may support operation of a variety of service applications (e.g., web applications, email services, search engine services, etc.). These networked systems typically include a large number of resources distributed throughout one or more data centers, in which each resource comprises a physical server device or a virtual machine running on a physical server device. The physical server devices in the data center are specifically responsible for hosting and running the service applications and maintaining data for the service applications. In addition to server devices, a data center may include a number of "infrastructure devices." While server devices are specifically responsible for providing the service applications and maintaining data, infrastructure devices support the server devices or the server environment and do not run any service applications or maintain any data for the service applications. These infrastructure devices may include, for instance, power distribution units, serial aggregators, thermostats, and network switches, to name a few.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to automated health monitoring and recovery of infrastructure devices supporting server devices in a data center. The health of infrastructure devices may be monitored based on the capabilities and/or operational context of each of the infrastructure devices. When an infrastructure device is unhealthy, automated recovery may be performed for the infrastructure device by selecting recovery actions based on the capabilities of the infrastructure device, failure mode of the infrastructure device, and/or operational context of the infrastructure device.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As previously indicated, data centers typically include a number of different infrastructure devices that support the operation of server devices within the data center or the server environment generally. In some instances, the infrastructure devices may fail and require some human intervention to recover the infrastructure devices or the infrastructure devices may simply be replaced. Typically, this has been a labor-intensive process. Additionally, the movement in data centers has been to purchase cheaper commodity hardware that has led to a greater likelihood of failure and increased burden on maintaining the data centers. For instance, power distribution units (PDUs) are a type of infrastructure device used in data centers. PDUs typically have a mechanism through a software interface to power server devices on and off, which is an important feature in controlling the power state of devices in the data center. However, PDUs may be prone to failure. Despite being unhealthy, PDUs may continue to supply power to server devices but may no longer be available to control that power. Instead, time outs or other errors may be received when commands are issued to the PDUs.

Embodiments of the present invention are directed to automatically monitoring the health of infrastructure devices within a data center and providing automated recovery of any unhealthy infrastructure devices. Because infrastructure devices support server devices running service applications, the health monitoring and recovery operations are selected and performed in a manner that reduces the likelihood of disrupting the operation of the infrastructure devices and server devices. This may include identifying what health monitoring and recovery operations are available for the infrastructure device and selecting particular operations based on the context of the infrastructure device in order to minimize any impact on the provision of services. For instance, health monitoring and/or recovery operations may be performed on a PDU in a manner that may allow the PDU to continue to provide power to operating server devices.

As used herein, "health" of an infrastructure device refers to the ability of the infrastructure device to perform normal operations for that type of device. Accordingly, an infrastructure device may have various failure modes that affect only a portion of the operations of that device that impact the health of the device. Health monitoring for an infrastructure device may be performed when a device is suspected to be unhealthy or according to a timed schedule (which may be configurable).

When a health monitoring event is triggered for an infrastructure device, the specific health monitoring process that will be used may be determined for that specific device. In particular, health analysis operations may be selected based at least in part on the capabilities of the infrastructure device. In particular, a data center will include different types of infrastructure devices with varying capabilities. Additionally, a data center may include different models of a particular type of infrastructure device with different capabilities. Accordingly, what types of health analysis operations may be performed on an infrastructure device may depend on the capabilities of the infrastructure device. The health analysis operations may also be selected in part on the operational context of the infrastructure device; that is, how the infrastructure device is currently being used in the data center. For instance, if the infrastructure device is currently supporting the operation of a number of servers in use, less invasive health analysis operations may be selected to reduce the likelihood of any adverse impact on the provision of services by the server devices. Alternatively, if the infrastructure device is not currently in use or not currently supporting any server devices in use, more invasive health analysis operations may be employed.

If an infrastructure device is unhealthy, an automated recovery operation may be employed to attempt to recover the infrastructure device while minimizing any impact to server devices being supported by the infrastructure device. Recovery actions may be selected for the automated recover operation based on the capabilities of the infrastructure devices, the specific failure mode of the infrastructure device, and/or the operational context of the infrastructure device. If the infrastructure device cannot be successfully recovered using the automated recovery operation, human intervention may be prompted.

Accordingly, in one aspect, an embodiment of the present invention is directed to one or more computer storage media storing computer-usable instructions that, when used by one or more computing devices, cause the one or more computing devices to perform operations. The operations include triggering a health monitoring event for an infrastructure device supporting one or more server devices in a data center. The operations also include identifying device information for the infrastructure device, and determining an operational context of the infrastructure device in supporting the one or more server devices in the data center. The operations further include determining a health monitoring process for the infrastructure device based on the device information for the infrastructure device and the operational context of the infrastructure device in supporting the one or more server devices in the data center and performing the determined health monitoring process for the infrastructure device to assess the health of the infrastructure device. The operations also include determining to perform an automated recovery operation for the infrastructure device based on the health of the infrastructure device. The operations further include in response to determining to perform the automated recovery operation for the infrastructure device, determining one or more recovery actions for the automated recovery operation based on the device information for the infrastructure device, the operational context of the infrastructure device in supporting the one or more server devices in the data center, and a failure context of the infrastructure device determined from the health monitoring process for the infrastructure device. The operations still further include performing at least a portion of the one or more recovery actions for the infrastructure device.

In another embodiment of the invention, as aspect is directed to one or more computer storage media storing computer-usable instructions that, when used by one or more computing devices, cause the one or more computing devices to perform operations. The operations include triggering a health monitoring event for an infrastructure device supporting one or more server devices in a data center. The operations also include determining a health monitoring process for the infrastructure device based on at least one selected from the following: device information for the infrastructure device, and an operational context of the infrastructure device in supporting the one or more server devices in the data center. The operations further include performing the determined health monitoring process for the infrastructure device to assess the health of the infrastructure device.

A further embodiment is directed to a system that includes one or more processors; and one or more computer storage media storing computer-usable instructions that, when used by the one or more processors, cause the one or more processors to: determine to perform an automated recovery operation for an infrastructure device supporting one or more server devices in a data center; in response to determining to perform the automated recovery operation for the infrastructure device, determine one or more recovery actions for the automated recovery operation based on at least on selected from the following: device information for the infrastructure device, an operational context of the infrastructure device in supporting the one or more server devices in the data center, and a failure context of the infrastructure device; and perform at least a portion of the one or more recovery actions for the infrastructure device.

Figure 1:
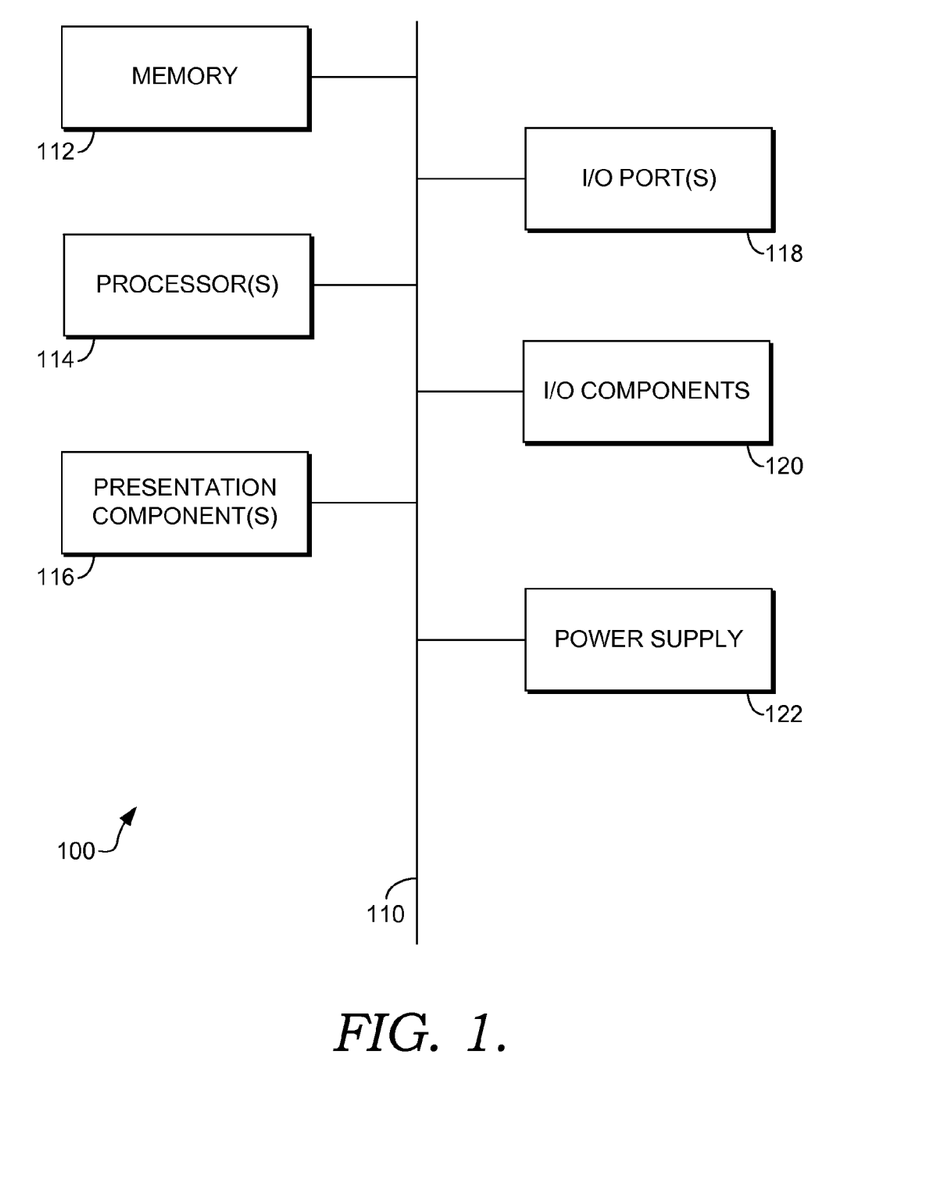
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc. The I/O components 120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

Figure 2:
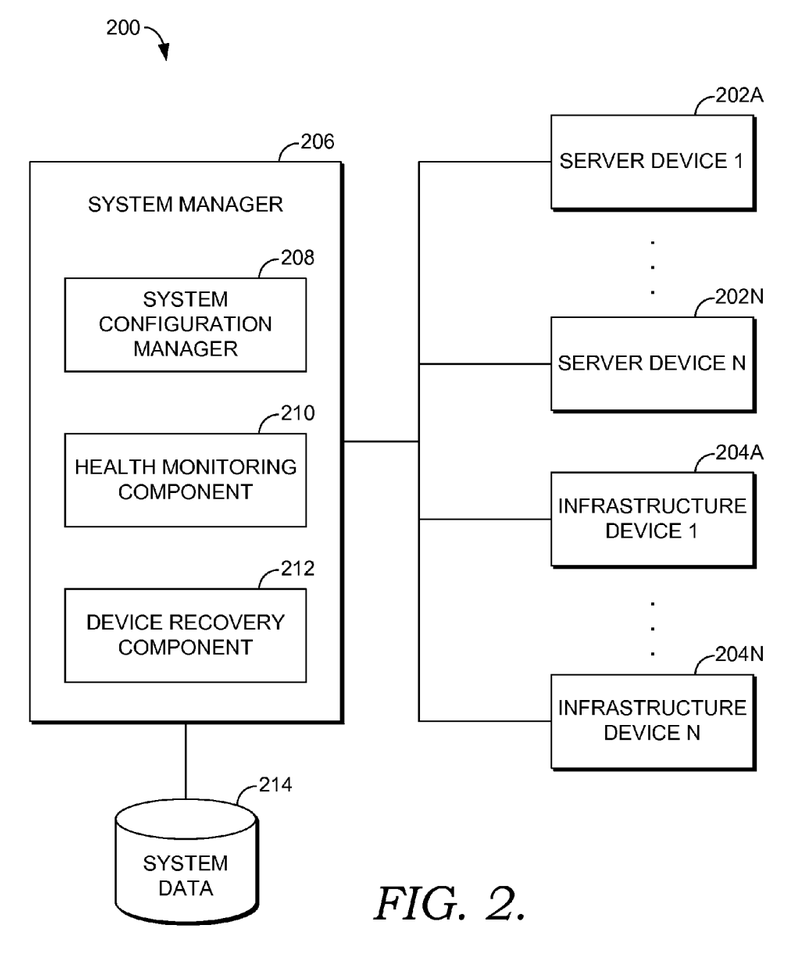
FIG. 2 is a block diagram of an exemplary data center architecture in which embodiments of the invention may be employed.

Turning now to FIG. 2 a block diagram is provided illustrating an exemplary data center 200 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 2, the data center 200 includes server devices 202A, 202N, infrastructure devices 204A, 204N, and a system manager 206. It should be understood that the system 200 shown in FIG. 2 is an example of one suitable data center architecture. Each component shown may include one or more computing devices similar to the computing device 100 described with reference to FIG. 1. The data center 200 should not be interpreted as having any dependency or requirement related to any single module/component or combination of modules/components illustrated therein. Each may comprise a single device or multiple devices cooperating in a distributed environment. For instance, the system manager 206 may comprise multiple devices arranged in a distributed environment that collectively provide the functionality described herein. Additionally, other components not shown may also be included within the network environment.

The data center 200 includes a number of server devices, such as server devices 202A, 202N. Although only two server devices are shown in FIG. 2, it should be understood that in practice, data centers typically include a large number of server devices. Each of the server devices are responsible for hosting and running service applications that provide some service to client devices external to the data center 200. The data center 200 also includes a number of infrastructure devices, such as infrastructure devices 204A, 204N. Although only two infrastructure devices are shown in FIG. 2, it should be understood that in practice, data centers typically include a large number of infrastructure devices of varying types. In contrast to the server devices, the infrastructure devices do not host or run any service applications. Instead, the infrastructure devices support the server devices and/or the server environment generally. By way of example only and not limitation, the infrastructure devices may include PDUs, serial aggregators, thermostats, and network switches, to name a few.

The system manager 206 generally operates to manage infrastructure devices in the data center, such as the infrastructure devices 204A, 204N, by performing health analysis operations and automated recovery operations for the infrastructure devices. As shown in FIG. 2, the system manager 206 includes, among other components not shown, a system configuration manager 208, health monitoring component 210, and device recovery component 212.

The system configuration manager 208 operates to collect information regarding infrastructure devices, such as the infrastructure devices 204A, 204N, and server devices, such as the server devices, 202A, 202N, within the data center and to store the information in a system data datastore 214. The information may be entered manually by a system administrator and/or accessed by the system configuration manager 208 querying infrastructure devices and/or server devices connected in the data center.

Information collected for infrastructure devices may include device information for each of the infrastructure devices. The device information may include information identifying a type of device for an infrastructure device. For instance, an infrastructure device may be identified as a PDU, serial aggregator, thermostat, network switch, or other type of infrastructure device. The device information may also include more specific device information, such as a manufacture and/or model of an infrastructure device. The device information may further set forth specific capabilities of an infrastructure device.

The system configuration manager 208 may also collect operational context information for infrastructure devices. The operational context information may include information identifying how an infrastructure device is currently operating or planned to be operated within the data center. This may include information indicating whether the infrastructure device is currently in use. If in use, the operational context information may identify how the infrastructure device is being used, for instance, by specifying what functions are being provided by the infrastructure device and what servers are being supported by the infrastructure device. The operational context information may further include information identifying the operation of servers being supported by the infrastructure device. This may include information regarding whether each server device is currently being used and, if so, what operations are being performed by each server device. Beyond current operational information, the operation context information may include planned use of infrastructure devices and server devices being supported by the infrastructure devices.

The health monitoring component 210 operates to analyze the health of infrastructure devices in the data center, such as the infrastructure devices 204A, 204N. A health monitoring event for an infrastructure device may be triggered in a number of different manners within the scope of embodiments of the present invention. In some cases, the system manager 206 may receive information indicating that an infrastructure device may be unhealthy. For instance, if an infrastructure device is instructed to perform a particular operation and returns a failure, this may indicate that the infrastructure device is unhealthy. Accordingly, if the system manager 206 receives information indicating that an infrastructure device is suspected to be unhealthy, the health monitoring component 210 may perform a health analysis for that infrastructure device.

In other instances, health monitoring events may be performed on a periodic basis for an infrastructure device regardless of whether the infrastructure device is suspected to be unhealthy. For instance, a schedule may be set for monitoring the health of an infrastructure device, and a health monitoring event may be periodically triggered in accordance with the schedule. In some cases, a maximum time period may be set for health monitoring events such that a health monitoring event may be triggered with the time period since the last health monitoring event lapses. For example, a health monitoring event may be performed at one point in time for an infrastructure device based on suspecting the infrastructure device is unhealthy. After a set time period after that health monitoring event lapses, another health monitoring event may be triggered.

When a health monitoring event is triggered for an infrastructure device, the health monitoring component 210 determines a health monitoring process for the infrastructure device based on information available for the infrastructure device, such as device information and/or operational context information. Generally, the health monitoring component 210 attempts to select health analysis operations sufficient to determine the health of the infrastructure device while minimizing any disruption to the operation of the infrastructure device and/or any server devices supported by the infrastructure device.

In some instances, the health monitoring component 210 may select health analysis operations for an infrastructure device based at least in part on device information available for the infrastructure device. As can be understood, data centers typically include a variety of different types of infrastructure devices. Each of those types of infrastructure devices have different functions and capabilities, and therefore the health analysis operations that can be taken will vary for the different types of infrastructure devices. Additionally, different models (from the same or different manufacturers) for a particular type of infrastructure device may also often have different capabilities. Therefore, the health analysis operations that can be taken for a particular type of infrastructure device may vary among different models. However, there are typically at least some health analysis operations that are common among the various models of a particular device type.

If the only device information available for an infrastructure device is the device type, health analysis operations that are common for that device type may be identified as possible operations to take for the health monitoring event. However, if the device information specifies a particular manufacture and/or model, additional health analysis operations may be available based on the capabilities of that manufacture/model. In some cases, the device information may specify the particular capabilities of the infrastructure device, and the possible health analysis operations may be identified based on those specified capabilities.

The health analysis operations may also be determined based at least in part on the operational context of the infrastructure device. Generally, the health monitoring component 210 attempts to select health analysis operations that are less likely to impact the operation of the infrastructure device and/or any supported servers. Accordingly, the operational context of the infrastructure device may be used to determine the invasiveness of health analysis operations selected for the health monitoring event. For instance, if the infrastructure device is currently in use and supporting a number of server devices also currently in use in providing service applications, less invasive health analysis operations may be selected. Alternatively, if the infrastructure device is not in use and/or no server devices are currently being supported, more invasive health analysis operations may be selected. In some instances, the operational context of the infrastructure device may indicate that the infrastructure device and/or supported servers are scheduled to be taken out of use at a particular time. Based on that information, the health monitoring component 210 may schedule more invasive health analysis operations at that particular time while currently performing less invasive or no health analysis operations.

The health monitoring component 210 performs the health monitoring process determined for the infrastructure device to assess the health of the infrastructure device. In some instances, the health monitoring component 210 may determine the infrastructure device is healthy. In other instances, the health monitoring component 210 may determine the infrastructure device is unhealthy and recovery of the infrastructure device is warranted.

The device recovery component 212 operates to recover an unhealthy infrastructure device. The device recovery component 212 may attempt to perform automated recovery by determining automated recovery actions that may be performed on the infrastructure device. The automated recovery actions may be determined based on device information, operational context information, and/or failure information for the infrastructure device.

The device information for the infrastructure device may provide information for determining what automated recovery actions are available for the infrastructure device based on the capabilities of the infrastructure device. If only device type is known for the infrastructure device, automated recovery actions common for that device type may be determined. If manufacture and/or model information is available for the infrastructure device, automated recovery actions available for that manufacture and/or model may be identified. Alternatively, specific capabilities of the infrastructure device may be known, and automated recovery actions may be determined based on those specific capabilities.

Failure information for the infrastructure device may indicate what recovery actions may be needed to recover the infrastructure device. In particular, different types of failures may warrant different recovery actions.

The operational context of the infrastructure device may be used to help determine what automated recovery actions are appropriate given how the infrastructure device and/or any supported server devices are being operated. Generally, the device recovery component 212 attempts to select automated recovery actions that are less likely to interfere with the operation of the infrastructure device and/or support server devices. For instance, if the infrastructure device is in use and a number of supported servers are also in use, less invasive automated recovery actions may be selected. Alternatively, if the infrastructure device and supported server devices are not currently in operation, more invasive automated recovery actions may be selected. In some instances, the operational context of the infrastructure device may indicate that the infrastructure device and/or supported servers are scheduled to be taken out of use at a particular time. Based on that information, the device recovery component 212 may schedule more invasive automated recovery actions at that particular time while currently performing less invasive or no device recovery operations.

After selecting appropriate automated recovery actions, the device recovery component 212 performs the automated recovery process for the infrastructure device. The health monitoring component 210 may analyze the health of the infrastructure device during and/or after the automated recovery process to determine if the infrastructure device has been successfully recovered. If not, the device recovery component 212 may prompt human intervention. For instance, the device recovery component 212 may provide information for presentation to an administrator to prompt the administrator to address the infrastructure device failure.

The information may include an identification of the infrastructure device, device information, operational context information, and failure information for the infrastructure device. In some cases, the device recovery component 212 may also provide recommended interventions for the administrator.

Figure 3:
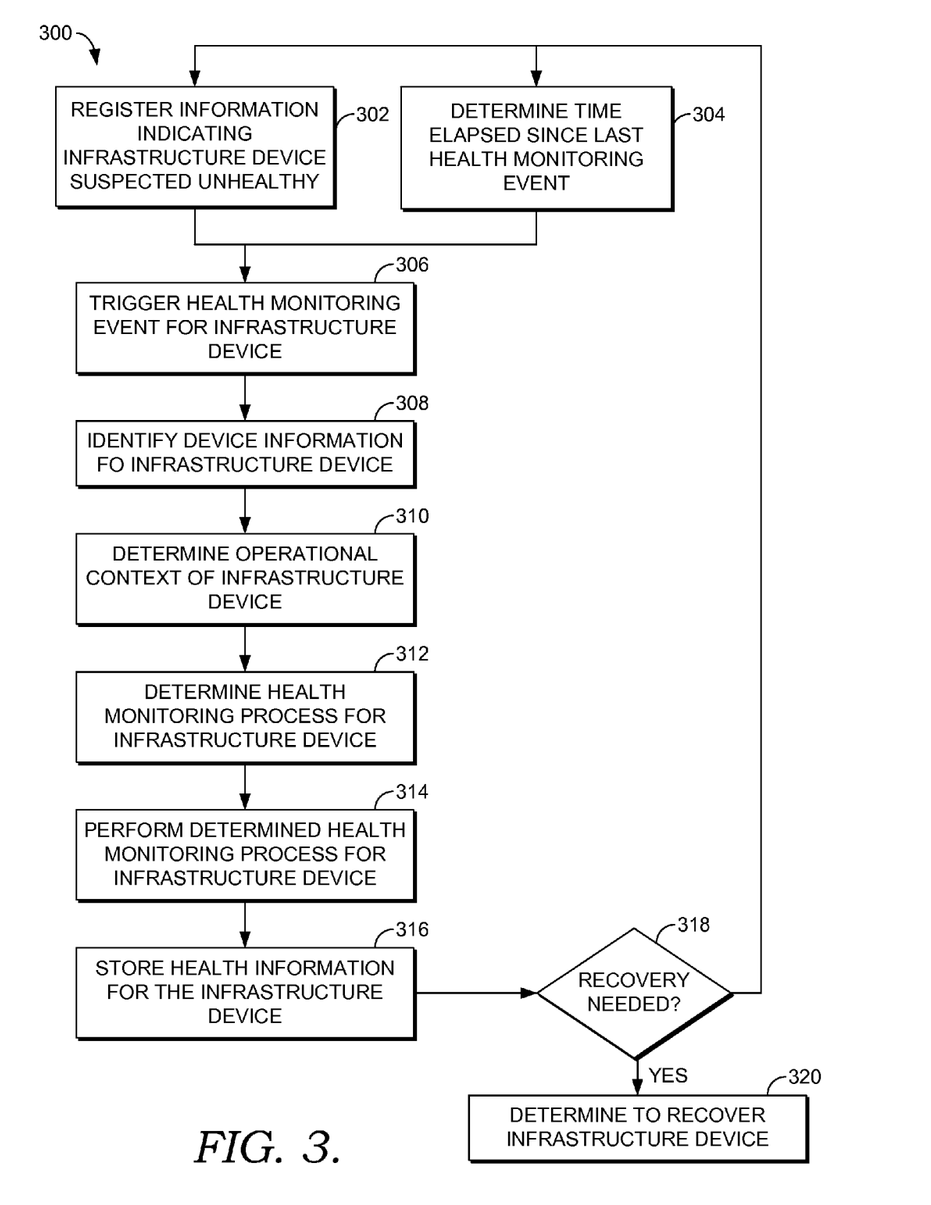
FIG. 3 is a flow diagram showing a method for assessing the health of an infrastructure device supporting servers in a data center in accordance with an embodiment of the present invention.

With reference now to FIG. 3, a flow diagram is provided that illustrates a method 300 for assessing the health of an infrastructure device supporting servers in a data center. As shown at block 306, a health monitoring event is triggered for an infrastructure device. The health monitoring event may be triggered in any of a variety of different manners. For instance, the health monitoring event may be triggered based on the system registering information indicating the infrastructure device is suspected to be unhealthy, as shown at block 302. In some instances, the health monitoring event may be triggered based a time elapsing since a previous health monitoring event, as shown at block 304. For instance, the system may be configured to monitor the health of the infrastructure device on a timed schedule. Accordingly, the health monitoring event for the infrastructure device may be triggered at various times according to the set schedule. Alternatively, if a previous health monitoring event was triggered based on an indication that the infrastructure device may be unhealthy, the current health monitoring event may be based a time since that previous health monitoring event instead of set schedule. It should be understood that other types of events may trigger a health monitoring event for the infrastructure device.

Device information for the infrastructure device may be identified, as shown at block 308. For instance, the system may maintain device information for various infrastructure devices in the data center. By way of example only, the device information may include a device identifier and may identify a type of device (e.g., PDU, serial aggregator, thermostat, network switch, etc.), manufacture, and/or model for the infrastructure device.

An operational context of the infrastructure device may be determined, as shown at block 310. The operational context for the infrastructure device may include any information regarding how the infrastructure device is intended to be currently used. This may include, for instance, whether the infrastructure device is currently in use. If in use, the information may include what portions of the infrastructure device or capabilities of the infrastructure device are currently intended to be in use. Alternatively or additionally, the operational context for the infrastructure device may include information regarding the operation of server devices or the server environment being supported by the infrastructure device. This may include whether each server device is currently in use, and if so, what functions are currently being performed by each of the server devices. Beyond current operation information, the operational context for the infrastructure device may include planned operation information. For instance, the operational context may include information regarding scheduled times when the infrastructure device or server devices it supports will not be in use or the planned use is expected to be different from the current use.

A health monitoring process to be used to examine the health of the infrastructure device is determined at block 312. The health monitoring process may be determined based on the device information and/or the operational context for the infrastructure device. Generally, the health monitoring process may be determined based on whatever information is available for the infrastructure device. Accordingly, although the method 300 illustrates an embodiment in which both device information and operational context information are accessed for the infrastructure device, in some embodiments only device information or only operational context information may be accessed and used to determine the health monitoring process.

Generally, device information may allow the system to determine the capabilities the infrastructure device, which may impact what types of health analysis operations may be taken on the infrastructure device. The operational context of the infrastructure device may allow the system to determine what health analysis operations and, more particularly, the invasiveness of health analysis operations that are appropriate given how the infrastructure device and/or server devices being supported are currently operating or are planned to be operated.

The health monitoring process determined at block 312 is performed for the infrastructure device, as shown at block 314. In some instances, the health monitoring process may include a single action and that single action may be performed. In other instances, the health monitoring process may include multiple actions that may be performed in parallel or in series. In some instances, the health monitoring process may include performing some actions based on results from previous actions.

Health information regarding the infrastructure device determined from the health monitoring process may be stored, as shown at block 316. A determination regarding whether recovery of the infrastructure device is warranted is made at block 318. If it is determined the infrastructure is unhealthy, a determination to recover the infrastructure device is made at block 320. Alternatively, as shown by the return to blocks 302 and 304, if the infrastructure is not unhealthy such that recovery is not needed, the process may continue by performing another health monitoring event if one is triggered, for instance, based on future information indicating the infrastructure device is unhealthy or an elapsed time used for health monitoring purposes.

Figure 4:
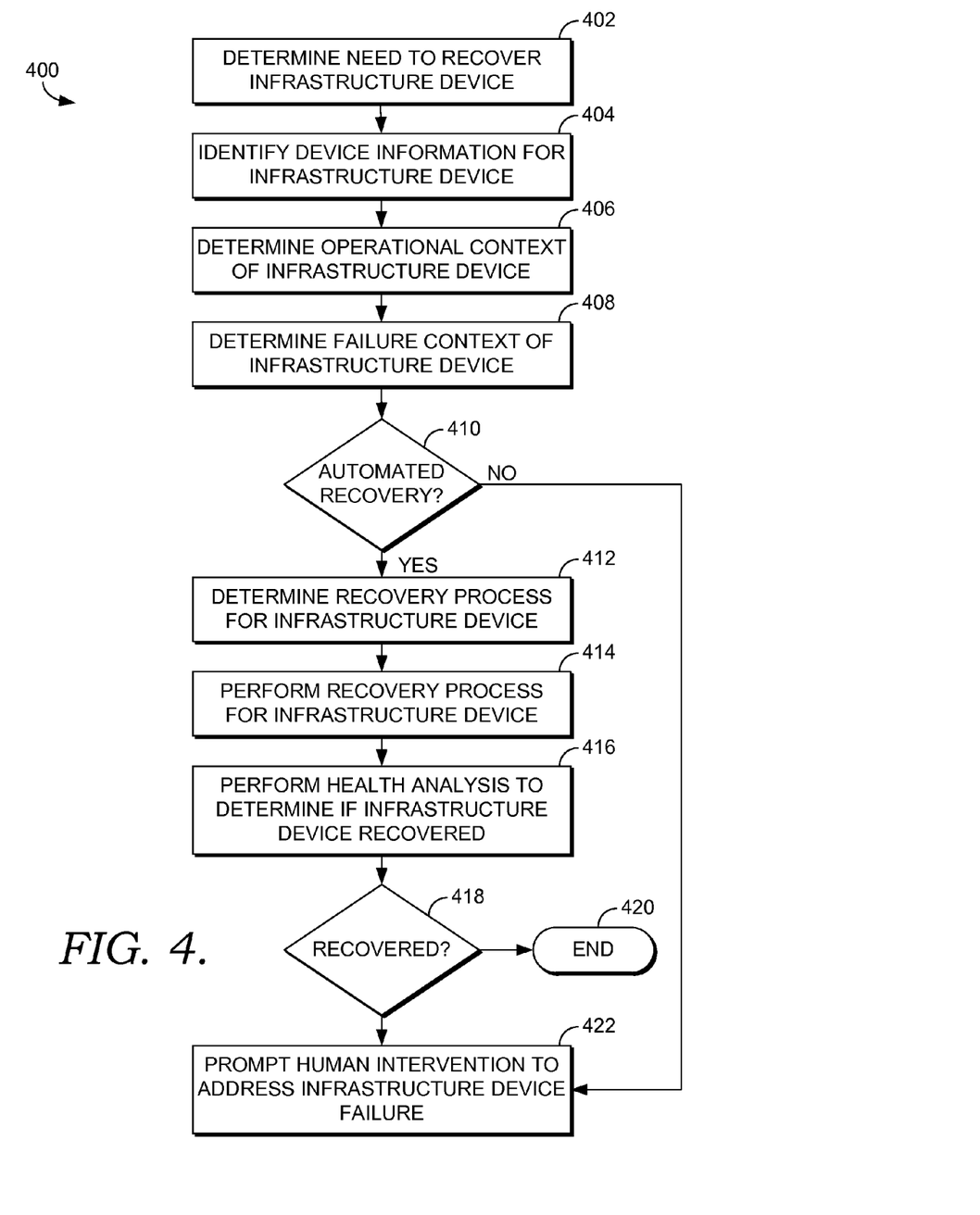
FIG. 4 is a flow diagram showing a method for automated recovery of an infrastructure device supporting servers in a data center in accordance with an embodiment of the present invention.

Turning to FIG. 4, a flow diagram is provided illustrating a method 400 for automated recovery of an infrastructure device supporting servers in a data center. Initially, as shown at block 402, a determination is made to recover an infrastructure device. This determination may be made based on a health monitoring process performed to determine the health of the infrastructure device, such as the process discussed above with reference to FIG. 3. In other instances, information may be obtained regarding the status of the infrastructure device independent of a health monitoring process that indicates the infrastructure device is unhealthy and recovery is warranted.

Device information for the infrastructure device may be identified, as shown at block 404. For instance, the system may maintain device information for various infrastructure devices in the data center. By way of example only, the device information may include a device identify and may identify a type of device (e.g., PDU, serial aggregator, thermostat, network switch, etc.), manufacture, and/or model for the infrastructure device.

An operational context of the infrastructure device may be determined, as shown at block 406. The operational context for the infrastructure device may include any information regarding how the infrastructure device is intended to be currently used. This may include, for instance, whether the infrastructure device is currently in use. If in use, the information may include what portions of the infrastructure device or capabilities of the infrastructure device are currently intended to be in use. Alternatively or additionally, the operational context for the infrastructure device may include information regarding the operation of server devices or the server environment being supported by the infrastructure device. This may include whether each server device is currently in use, and if so, what functions are currently being performed by each of the server devices. Beyond current operation information, the operational context for the infrastructure device may include planned operation information. For instance, the operational context may include information regarding scheduled times when the infrastructure device or server devices it supports will not be in use or the planned use is expected to be different from the current use.

A failure context of the infrastructure device may be determined, as shown at block 408. The failure context may include any information regarding what caused the infrastructure device to be determined to be unhealthy or otherwise caused the determination that recovery is warranted for the device. This may indicate, for instance, what aspects of the infrastructure device may be not be functioning properly.

A determination is made at block 410 regarding whether automated recovery will be employed. In particular, under some conditions recovery actions may be automatically performed for the infrastructure device by the system, while under other conditions, human intervention may be needed. The determination regarding whether automated recovery will be employed may be based on information available for the infrastructure device. Accordingly, although the method 400 illustrates an embodiment in which device information, operational context information, and failure context information are accessed for the infrastructure device, in some embodiments any combination of one or more of those pieces of information may be accessed and used to determine whether to employ automated recovery. Generally, the device information may indicate whether the infrastructure device has capabilities that allow for automated recovery. The operational context information may provide information regarding whether automated recovery is viable given how the infrastructure device and/or supported server devices are being used. The failure context information may provide information regarding whether the type of failure for the infrastructure device is one for which automated recovery may be used.

If a determination is made that automated recovery is not available, human intervention may be prompted, as shown at block 422. For instance, a message may be presented to an administrator that the infrastructure device is unhealthy and that human intervention is needed to recover the recovery device. In some instances, the system may provide information regarding the infrastructure device, such as device information, operational context information, and/or failure context information. The system may also suggest recommended actions that may be taken based on the information available for the infrastructure device.

Alternatively, if determination is made that automated recovery is available, an automated recovery operation is determined, as shown at block 412. Generally, the health monitoring process may be determined based on whatever information is available for the infrastructure device, include device information, operational context information, and/or failure information. Generally, the device information may provide information regarding the device and its capabilities and therefore what recovery actions may be performed in general for the device. The operational context information may provide information for determining what recovery actions may be taken that may limit the impact on the operation of the infrastructure device and/or supported servers. The failure information may dictate what recovery actions are needed to address the specific failure of the infrastructure device.

The automated recovery operation determined at block 412 is performed for the infrastructure device, as shown at block 414. In some instances, the automated recovery process may include a single recovery action and that single recovery action may be performed. In other instances, the automated recovery process may include multiple recovery actions that may be performed in parallel or in series. In some instances, the automated recovery process may include performing some recovery actions based on results from previous actions. Servers being supported by the infrastructure device may be monitored during the automated recovery process to identify any adverse changes in the operation of those server devices. If any adverse changes are detected, the recovery actions being employed may be modified to reduce the likelihood of impacting the operation of those server devices.

Health monitoring may be performed to determine if the infrastructure device has been recovered, as shown at block 416. This may be performed when the automated recovery process has been completed or at certain times within the automated recovery process (which may dictate whether additional recovery actions are needed based on results of the health analysis). A determination is made at block 418 regarding whether the infrastructure device has been recovered. If it is determined that the infrastructure device has been recovered, the process may end as shown at block 420. Alternatively, if it is determined that the infrastructure device has not been recovered by the automated recovery process, human intervention may be prompted as shown at block 422.

As can be understood, embodiments of the present invention provide for monitoring the health of infrastructure devices in data centers and for automated recovery of infrastructure devices in a manner that reduces the likelihood of disrupting the operation of the infrastructure devices and/or server devices supported by the infrastructure devices.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   triggering a health monitoring event for an infrastructure device supporting one or more server devices in a data center;
   identifying device information for the infrastructure device;
   determining an operational context of the infrastructure device in supporting the one or more server devices in the data center;
   determining a health monitoring process for the infrastructure device based on the device information for the infrastructure device and the operational context of the infrastructure device in supporting the one or more server devices in the data center;
   performing the determined health monitoring process for the infrastructure device to assess health of the infrastructure device;
   determining to perform an automated recovery operation for the infrastructure device based on the health of the infrastructure device;
   in response to determining to perform the automated recovery operation for the infrastructure device, determining one or more recovery actions for the automated recovery operation based on the device information for the infrastructure device, the operational context of the infrastructure device in supporting the one or more server devices in the data center, and a failure context of the infrastructure device determined from the health monitoring process for the infrastructure device; and
   performing at least a portion of the one or more recovery actions for the infrastructure device.

2. The one or more computer storage media of claim 1, wherein the health monitoring event is triggered based at least in part on a scheduled basis for monitoring the health of the infrastructure device.

3. The one or more computer storage media of claim 1, wherein the health monitoring event is triggered based at least in part on registering information indicating the infrastructure device may be unhealthy.

4. The one or more computer storage media of claim 1, wherein the device information for the infrastructure device comprises at least one selected from the following: a device type of the infrastructure device, a manufacture of the infrastructure device, and a model of the infrastructure device.

5. The one or more computer storage media of claim 1, wherein determining the health monitoring process for the infrastructure device comprises:
   determining a plurality of available health analysis operations for the infrastructure device; and
   selecting one or more of the available health analysis operations for the health monitoring process based on the operational context of the infrastructure device.

6. The one or more computer storage media of claim 1, wherein determining the health monitoring process for the infrastructure device includes determining to delay at least a portion of the health monitoring process for the infrastructure device until the operational context for the infrastructure device changes.

7. The one or more computer storage media of claim 1, wherein determining the need to perform the automated recovery operation based on the health of the infrastructure device includes determining to delay at least a portion of the automated recovery operation until the operational context for the infrastructure device changes.

8. The one or more computer storage media of claim 1, wherein determining the one or more recovery actions for the automated recovery operation comprises:
   determining a plurality of available recovery actions for the infrastructure device; and
   selecting the one or more recovery actions from the available recovery actions based on the operational context of the infrastructure device.

9. The one or more computer storage media of claim 1, wherein the operations further include:
   monitoring operation of at least one of the one or more server devices when the one or more recovery actions are performed;

detecting an adverse change in the operation of at least one of the one or more server devices; and in response to detecting the adverse change, modifying the one or more recovery actions.

10. The one or more computer storage media of claim 1, wherein the operations further include:

determining that the automated recovery operation is unsuccessful in recovering the infrastructure device; and prompting human intervention to recover the infrastructure device.

11. A system comprising:

one or more processors; and one or more computer storage media storing computer-useable instructions that, when used by the one or more processors, cause the one or more processors to:

trigger performance of an automated recovery operation for an infrastructure device supporting one or more server devices in a data center;

determine one or more recovery actions for the automated recovery operation based on at least one selected from the following: device information for the infrastructure device, an operational context of the infrastructure device in supporting the one or more server devices in the data center, and a failure context of the infrastructure device, the one or more recovery actions comprising one or more actions attempting to recover the infrastructure device;

perform at least a portion of the one or more recovery actions for the infrastructure device;

monitor operation of at least one of the one or more server devices when the one or more recovery actions are performed;

detect an adverse change in the operation of at least one of the one or more server devices; and in response to detecting the adverse change, modify the one or more recovery actions.

12. The system of claim 11, wherein triggering the performance of the automated recovery operation includes determining to delay at least a portion of the automated recovery operation until the operational context for the infrastructure device changes.

13. The system of claim 11, wherein determining the one or more recovery actions for the automated recovery operation comprises:

determining a plurality of available recovery actions for the infrastructure device; and selecting the one or more recovery actions from the available recovery actions based on the operational context of the infrastructure device.

14. The system of claim 11, wherein the instructions further cause the one or more processors to:

determine that the automated recovery operation is unsuccessful in recovering the infrastructure device; and prompt human intervention to recover the infrastructure device.

15. A computer-implemented method comprising:

triggering a health monitoring event for an infrastructure device supporting one or more server devices in a data center;

identifying device information for the infrastructure device;

determining an operational context of the infrastructure device in supporting the one or more server devices in the data center;

determining a health monitoring process for the infrastructure device based on the device information for the infrastructure device and the operational context of the infrastructure device in supporting the one or more server devices in the data center;

performing the determined health monitoring process for the infrastructure device to assess health of the infrastructure device;

determining to perform an automated recovery operation for the infrastructure device based on the health of the infrastructure device;

in response to determining to perform the automated recovery operation for the infrastructure device, determining one or more recovery actions for the automated recovery operation based on the device information for the infrastructure device, the operational context of the infrastructure device in supporting the one or more server devices in the data center, and a failure context of the infrastructure device determined from the health monitoring process for the infrastructure device; and performing at least a portion of the one or more recovery actions for the infrastructure device.

16. The method of claim 15, wherein determining the health monitoring process for the infrastructure device comprises:

determining a plurality of available health analysis operations for the infrastructure device; and selecting one or more of the available health analysis operations for the health monitoring process based on the operational context of the infrastructure device.

17. The method of claim 15, wherein determining the health monitoring process for the infrastructure device includes determining to delay at least a portion of the health monitoring process for the infrastructure device until the operational context for the infrastructure device changes.

18. The method of claim 15, wherein determining the need to perform the automated recovery operation based on the health of the infrastructure device includes determining to delay at least a portion of the automated recovery operation until the operational context for the infrastructure device changes.

19. The method of claim 15, wherein determining the one or more recovery actions for the automated recovery operation comprises:

determining a plurality of available recovery actions for the infrastructure device; and selecting the one or more recovery actions from the available recovery actions based on the operational context of the infrastructure device.

20. The method of claim 15, wherein the operations further include:

monitoring operation of at least one of the one or more server devices when the one or more recovery actions are performed;

detecting an adverse change in the operation of at least one of the one or more server devices; and in response to detecting the adverse change, modifying the one or more recovery actions.

* * * * *